United States Patent
Fremaux et al.

(10) Patent No.: US 9,900,383 B2
(45) Date of Patent: Feb. 20, 2018

(54) SYNCHRONISATION OF THE INPUT DATA LINKS OF A COMPUTER

(71) Applicants: SAFRAN AIRCRAFT ENGINES, Paris (FR); SAFRAN ELECTRONICS & DEFENSE, Boulogne-Billancourt (FR)

(72) Inventors: Oceane Lucienne Monique Fremaux, Moissy-Cramayel (FR); Patrick Lavernhe, Boulogne-Billancourt (FR); Ruben Abraham Elbaz, Moissy-Cramayel (FR)

(73) Assignees: SAFRAN AIRCRAFT ENGINES, Paris (FR); SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/301,035

(22) PCT Filed: Mar. 30, 2015

(86) PCT No.: PCT/FR2015/050812
§ 371 (c)(1),
(2) Date: Sep. 30, 2016

(87) PCT Pub. No.: WO2015/150678
PCT Pub. Date: Oct. 8, 2015

(65) Prior Publication Data
US 2017/0034265 A1    Feb. 2, 2017

(30) Foreign Application Priority Data
Apr. 1, 2014 (FR) ..................... 14 52867

(51) Int. Cl.
*G06F 15/167* (2006.01)
*H04L 29/08* (2006.01)
(Continued)

(52) U.S. Cl.
CPC .......... *H04L 67/1095* (2013.01); *H04L 49/10* (2013.01); *H04L 49/9021* (2013.01); *H04L 67/1097* (2013.01); *H04L 67/12* (2013.01)

(58) Field of Classification Search
USPC ................................ 709/201, 212, 223, 248
See application file for complete search history.

(56) References Cited

U.S. PATENT DOCUMENTS

| 5,301,970 A | * | 4/1994 | Haskins | .................... A61G 5/08 280/250.1 |
| 6,272,137 B1 | * | 8/2001 | Noiri | .................... H04L 49/1553 370/249 |

(Continued)

FOREIGN PATENT DOCUMENTS

WO    WO 2008/032296 A2    3/2008

OTHER PUBLICATIONS

International Search Report dated Jun. 23, 2015 in PCT/FR2015/050812, filed Mar. 30, 2015.

*Primary Examiner* — Liangche A Wang
(74) *Attorney, Agent, or Firm* — Oblon, McClelland, Maier & Nestadt, L.L.P.

(57) ABSTRACT

A method for synchronizing data frames, including an initialization phase storing the frames received on each of links in a buffer memory dedicated to the link, the frames stored in a first position of a second buffer memory dedicated to a second link and a first position of a third buffer memory dedicated to a third link including a same predefined identification number, and a first buffer memory dedicated to a first link storing a number of frames equal to the smallest multiple of a first predefined number greater than or equal to double the number of frames received on one of the second or third links, and an operation phase storing the frames received on each of the links in the buffer memories, each frame stored in a position on the second (Continued)

buffer memory including the same identification number as the frame stored at the same position of the third buffer memory.

12 Claims, 7 Drawing Sheets

(51) Int. Cl.
*H04L 12/933* (2013.01)
*H04L 12/883* (2013.01)

(56) References Cited

U.S. PATENT DOCUMENTS

| | | | |
|---|---|---|---|
| 7,362,779 B1* | 4/2008 | Zabezhinsky | H04J 3/1611 370/512 |
| 2005/0058149 A1* | 3/2005 | Howe | H04L 47/10 370/428 |
| 2008/0069149 A1* | 3/2008 | Poulin | H04J 3/14 370/503 |

* cited by examiner

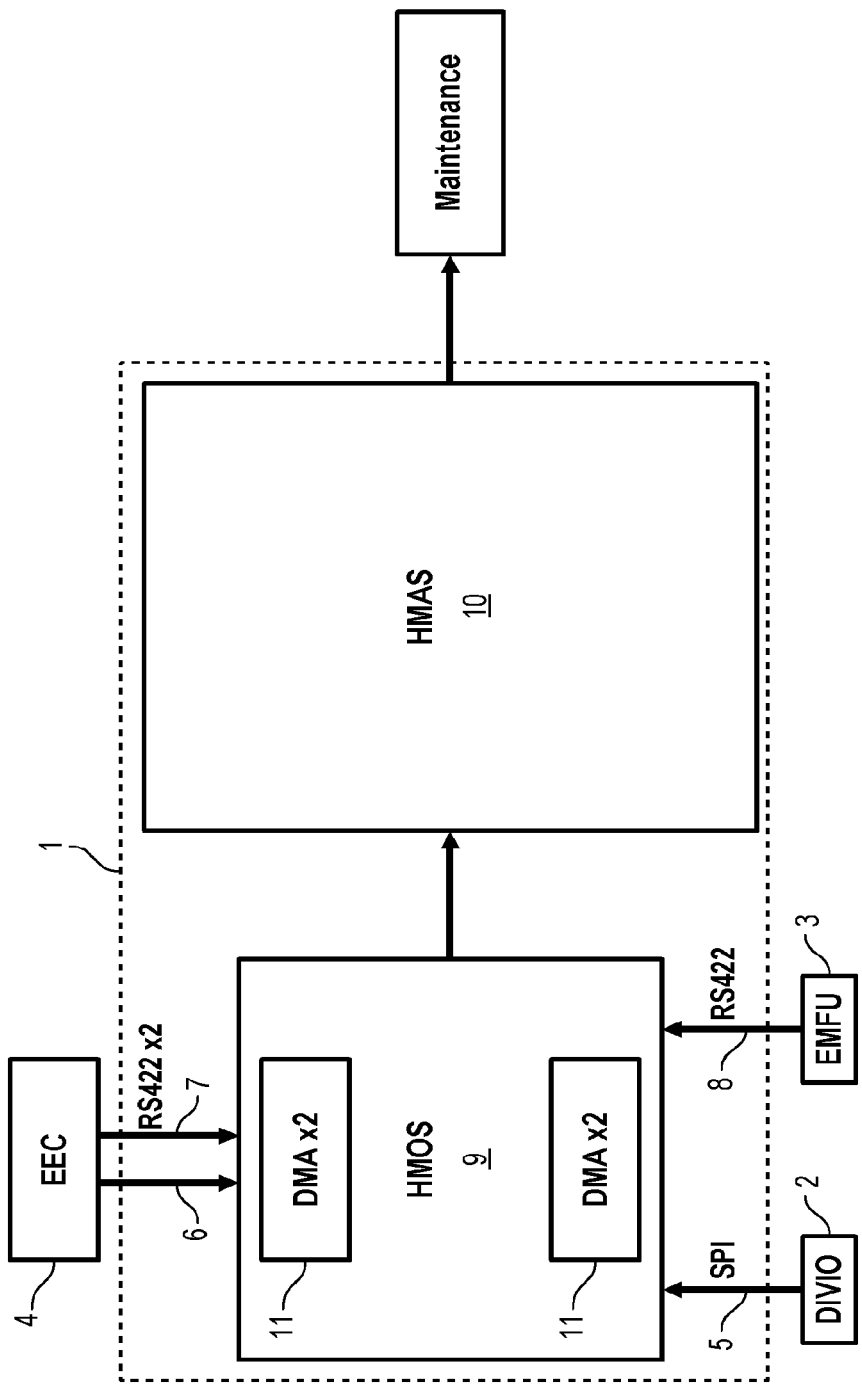

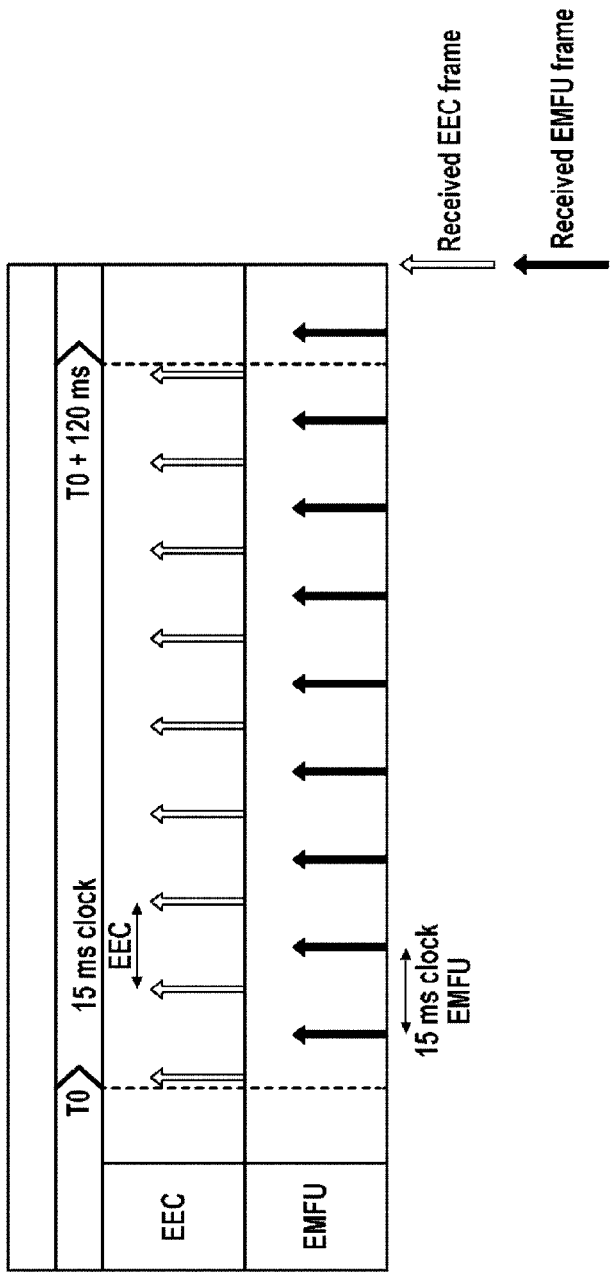

FIG. 7a

| mf | 1 | 2 | 3 | 4 | 5 | 6 | 7 | 8 | 9 | 10 | 11 | 12 | 13 | 14 | 15 | 16 | 1 | 2 | 3 | 4 | 5 | 6 | 7 | 8 | 9 | 10 |
|---|---|---|---|---|---|---|---|---|---|---|---|---|---|---|---|---|---|---|---|---|---|---|---|---|---|---|
| A | 7 | 8 | 9 | 10 | 11 | 12 | 13 | 14 | 15 | 16 | 1 | 2 | 3 | 4 | 5 | 6 | 7 | 8 | 9 | 10 | 11 | 12 | 13 | | | |
| B | 2 | 3 | 4 | 5 | 6 | 7 | 8 | 9 | 10 | 11 | 12 | 13 | 14 | 15 | 16 | 1 | 2 | 3 | 4 | 5 | 6 | 7 | 8 | 9 | 10 | 11 |

FIG. 7b

| mf | 1 | 2 | 3 | 4 | 5 | 6 | 7 | 8 | 9 | 10 | 11 | 12 | 13 | 14 | 15 | 16 | 1 | 2 | 3 | 4 | 5 | 6 | 7 | 8 | 9 | 10 |
|---|---|---|---|---|---|---|---|---|---|---|---|---|---|---|---|---|---|---|---|---|---|---|---|---|---|---|
| A | | | | | | | | | | | 1 | 2 | 3 | 4 | 5 | 6 | 7 | 8 | 9 | 10 | 11 | 12 | 13 | | | |
| B | | | | | | | | | | | | | | | | 1 | 2 | 3 | 4 | 5 | 6 | 7 | 8 | 9 | 10 | 11 |

FIG. 7c

| mf | 1 | 2 | 3 | 4 | 5 | 6 | 7 | 8 | 9 | 10 | 11 | 12 | 13 | 14 | 15 | 16 | 1 | 2 | 3 |
|---|---|---|---|---|---|---|---|---|---|---|---|---|---|---|---|---|---|---|---|
| A | 1 | 2 | 3 | 4 | 5 | 6 | 7 | 8 | 9 | 10 | 11 | 12 | 13 | | | | | | |
| B | 1 | 2 | 3 | 4 | 5 | 6 | 7 | 8 | 9 | 10 | 11 | | | | | | | | |

SYNCHRONISATION OF THE INPUT DATA LINKS OF A COMPUTER

GENERAL TECHNICAL FIELD

The subject of the invention is the synchronization of data frames transmitted on several digital links to an algorithm executed by a computer.

This synchronization more particularly applies to data frames processed by a maintenance algorithm of an aircraft maintenance computer.

STATE OF THE ART

Existing on-board systems equipping aircraft such as planes or helicopters generally comprise a computing unit known as an Engine Monitoring Unit—EMU, in charge of monitoring the engine to ensure maintenance functions and to predict future failures.

As illustrated in FIG. 1, the EMU consists of two computers: the EMFU 3 (Engine Monitoring Functional Unit) having functions allowing monitoring of engine status, and the HMFU 1 (Health Monitoring Functional Unit) having functions allowing anticipation of failures and facilitated maintenance.

The HFMU executes maintenance algorithms of the engine, the objective of which is to assess the health of the engine in real time on the basis of various data originating from aircraft sensors and avionics. Said data are derived from the two channels of an electronic engine controller EEC 4 for data from avionics and some sensors, from a DIVIO component 2 (Digitized Versatile Input Output) which processes data from the accelerometer sensors, and from the EMFU 3 for data from the other sensors. These data are transmitted to the HMFU in the form of frames via two links 6, 7 of RS422 type originating from the two EEC channels, via a link 8 of RS422 type originating from the EMFU and via a link 5 of SPI type originating from the DIVIO.

As illustrated in FIG. 2, the HFMU 1 executes an operating system (HMOS) 9 which receives the data transmitted on these links and supplies these data to an application software (HMAS) 10 executed by the HFMU. The HMAS reads the frames transmitted by the HMOS in RAM memory, decodes these frames and sends them at regular intervals to the maintenance algorithms executed by the HFMU.

To guarantee the proper execution and reliability of the results of the maintenance algorithms, the latter need to receive temporally coherent input data i.e. acquired at the same time. If the input data provided at a given time to the maintenance algorithms corresponds to acquisitions staggered in time, the results of the algorithms may be distorted. The guaranteeing of coherency between these input data particularly requires the release of the same amount of data on each sending of data to the maintenance algorithms, and hence the filling of the RAM memory as regularly as possible on each of the links.

More specifically, the transmitted frames contain an identification number. The identification numbers of the frames transmitted by the EEC are called labels. The two channels of the EEC send frames having labels incremented cyclically and continuously. The identification numbers of the frames transmitted by the other links are time stamps having a limit value that is sufficiently high for the flight duration times under consideration. The information contained in a frame transmitted by the EEC is dependent on the label of the frame. Therefore, each frame transmitted by the EEC contains data differing from the others but two EEC frames having the same label contain the same type of information. The design of maintenance algorithms implies the repeatability of the received input data. Therefore, the data stored in RAM memory and not yet read by the HMAS must always start with a frame of same label on the two EEC channels so that these two data frames always contain the same type of information.

Yet the different links each have their own internal clock and these are not synchronized with one another. They do not necessarily transmit all at the same time, nor exactly at their transmitting rate. As illustrated in FIG. 3, the number of frames transmitted on two links having the same transmitting rate over one same length of time may therefore differ. In the illustrated example, the EMFU link transmits one frame less than the EEC link over the same time interval of 120 ms.

In addition, as illustrated in FIG. 2, the frames transmitted by the different links are not directly made available to the HMAS application software by the HMOS; the data transmitted on each link are previously processed by a DMA component (Direct Memory Access). DMAs are processors with small internal memories which benefit from direct access to the RAM memory without interrupting computing. Each DMA only transfers received frames to the RAM memory for supplying thereof to the HMAS when its internal memory is full. Since the received frames are not all of the same size, the time needed for filling of the DMA internal memories from the different links may differ, and the number of frames made available to the HMAS over a given time period by the DMAs of the different links may not be the same.

Finally, a link may fail and no longer transmit frames either temporarily or definitively, in particular on restart of the EEC or EMFU.

These mechanisms lead to desynchronizations between the links and cause non-reproducible filling of the RAM memory as illustrated in FIG. 4. As a result, there is a risk that the maintenance algorithms will no longer be correctly fed with data and the presence of all information required for proper execution thereof among the data transmitted by the HMAS at a given time, is no longer guaranteed.

There is therefore a need for a method for synchronizing the data frames transmitted to a maintenance algorithm executed by an aircraft maintenance computer, allowing the transmitting of the same amount of data on each sending of data to the maintenance algorithm and guaranteeing repeatability of received input data, even in the event of interruption of data transmission on a link.

PRESENTATION OF THE INVENTION

The present invention, according to a first aspect, therefore relates to a method for synchronizing data frames transmitted to at least one maintenance algorithm, executed by an aircraft maintenance computer, on a first digital data link and on at least one second and one third secondary digital data links, said frames comprising an identification number, the identification numbers of the frames transmitted on the second and third links being comprised in a finite and cyclical sequence of numbers, the identification numbers of the frames transmitted on one of the second and third links being incremented on each transmission of a new frame on this link, said method being implemented by said computer and comprising:
- an initialization phase storing the frames received on each of said links in a buffer memory dedicated to said link, the frames stored at a first position of a second buffer memory dedicated to the second link and at a first position of a third buffer memory dedicated to the third link comprising one same predefined identification number, and a first buffer memory dedicated to the first link storing a number of frames equal to the smallest multiple of a first predefined number equal to or higher than twice the number of frames received on one of the second or third links,
- an operation phase storing the frames received on each of said links in their dedicated buffer memories, each frame stored at a position of the second buffer memory including the same identification number as the frame stored at the same position of the third buffer memory.

With such a method it is possible to provide the at least one maintenance algorithm with packets of frames that are always synchronized and always start with the same type of data, thereby ensuring good execution of said at least one algorithm.

The operation phase of the method according to the first aspect may comprise steps of:
- storing the frames successively received on the first link at successive positions of the first buffer memory,
- for each secondary link, storing the frames successively received on said secondary link and a padding frame for each frame transmitted on said secondary link and not received, at successive positions of a buffer memory dedicated to said secondary link,
- when frames are stored in the first buffer memory and in each buffer memory dedicated to a secondary link, over at least one second predefined number of positions, transmitting to said at least one maintenance algorithm the frames stored at said second predefined number of positions of said buffer memories.

This makes it possible to maintain synchronization of the transmitted frames despite transmission perturbations which may randomly prevent the receiving of some frames on some links.

The initialization phase of the method according to the first aspect may comprise the steps of:
- storing, at successive positions of the first buffer memory, a third predefined number of frames successively received on the first link during a first time interval,
- for each secondary link, storing at successive positions of the buffer memory dedicated to said secondary link the frames successively received on said secondary link during said first time interval and a padding frame for each frame transmitted on said secondary link during said first time interval and not received.
- deleting the frames stored before the first frame comprising the predefined identification number, at least in the second and third buffer memories,
- deleting the oldest frames among those stored in the first buffer memory, so that the first buffer memory stores a number of frames equal to the smallest multiple of the first predefined number equal to or higher than twice the number of frames received on one of the second or third links.

This makes it possible to synchronize the frames received on the different links during this initial phase despite the absence of a synchronized clock common to these links, and to store data of same type at the first position of the second and third buffer memories.

Said secondary links being able to comprise at least one additional secondary link such that the identification number of the frames received by the computer on said at least one additional secondary link comprises a time stamp; the initialization phase of the method according to the first aspect, for each additional secondary link, possibly comprising a step of deleting the oldest frames among the frames stored in the buffer memory dedicated to this link or of inserting padding frames, so that said buffer memory dedicated to said additional secondary link stores a number of frames equal to the number of frames, among the number of frames stored in the second and third buffer memory, that is closest to the number of frames received on said additional secondary link.

This makes it possible, during the initialization phase, to synchronize the data frames containing an identification number of time-stamped type with the data frames stored in the second and third buffer memories.

The method according to the first aspect may also comprise a step of detecting the frames transmitted on a link and not received, by comparing the identification numbers of the received frames.

This allows the computer to detect the frames transmitted and not received on a link, without having prior knowledge of the transmitted frames and without requiring complex processing by the computer.

In addition, the method according to the first aspect may comprise:
- a step of detecting the non-receiving of frames on a secondary link, so-called link down, during a time interval required for receiving of the first predefined number of frames on the first link,
- a step of detecting the receiving on said secondary link down of a set of successively received frames, said set of frames comprising a fourth predefined number of frames and a frame comprising the predefined identification number,
- a step of storing the frame comprising the predefined identification number and the frames subsequently received on said secondary link at successive positions of the buffer memory dedicated to said secondary link, so that the frames stored at a second position of the buffer memory dedicated to said secondary link and at a second position of the second or third buffer memory comprise the predefined identification number.

This makes it possible to detect a link on which no frame continues to be received, subsequently to detect at what time such a link again transmits frames that can be used and finally to resynchronize this link with the other links so that it is again possible to use the frames transmitted on this link without any desynchronization.

Therefore, according to a second aspect, the present invention relates to a computer program comprising code instructions for executing a method for synchronizing frames according to the first aspect when this program is executed by a processor.

The present invention, according to a third aspect, relates to a system comprising:
- an aircraft maintenance computer connected to at least one computing unit via at least one first digital data link and at least one second and one third secondary digital data links,
- a first buffer memory dedicated to the first link, and
- for each secondary data link, a buffer memory dedicated to said secondary data link,
- said maintenance computer being configured to implement the method according to the first aspect.

Such computer program product and system have the same advantages as those set forth for the method according to the first aspect.

According to one variant of embodiment, the buffer memories may be circular buffer memories.

The use of circular buffer memories allows the real-time processing of received frames without loss of data. The rapid rotation of circular buffer memories ensures the feed rate of input data to the at least one maintenance algorithm without perturbing the receiving of new frames.

In addition, each buffer memory dedicated to a secondary link may form a channel of a single buffer memory unit of said system to minimize the number of material units of buffer memory in the system.

Additionally, the first link may be a SPI link and the secondary digital links may be RS422 links.

The choice of a reliable SPI link as first link acting as reference clock allows the overcoming of clock differences between the links and ensures synchronization of the links without complexing the system through the use of an additional clock.

Finally, the maintenance computer may comprise a monitoring functional unit HMFU to anticipate failures and facilitate maintenance, the first link may be a SPI link connecting the maintenance computer to a digitized input-output unit DIVIO, and the secondary links may comprise three RS422 links connecting the maintenance computer to an engine monitoring functional unit EMFU and to the two channels of an electronic engine controller EEC.

PRESENTATION OF THE FIGURES

Other characteristics and advantages will become apparent on reading the following description of one embodiment. This description is given with reference to the appended drawings in which:

FIG. 1 schematically illustrates a monitoring system according to one embodiment of the invention;

FIG. 2 schematically illustrates an aircraft maintenance computer in the prior art;

FIG. 3 illustrates an example of link desynchronization;

FIG. 4 illustrates an example of buffer memory filling caused by desynchronization of the links when no processing is conducted;

Figure 5:
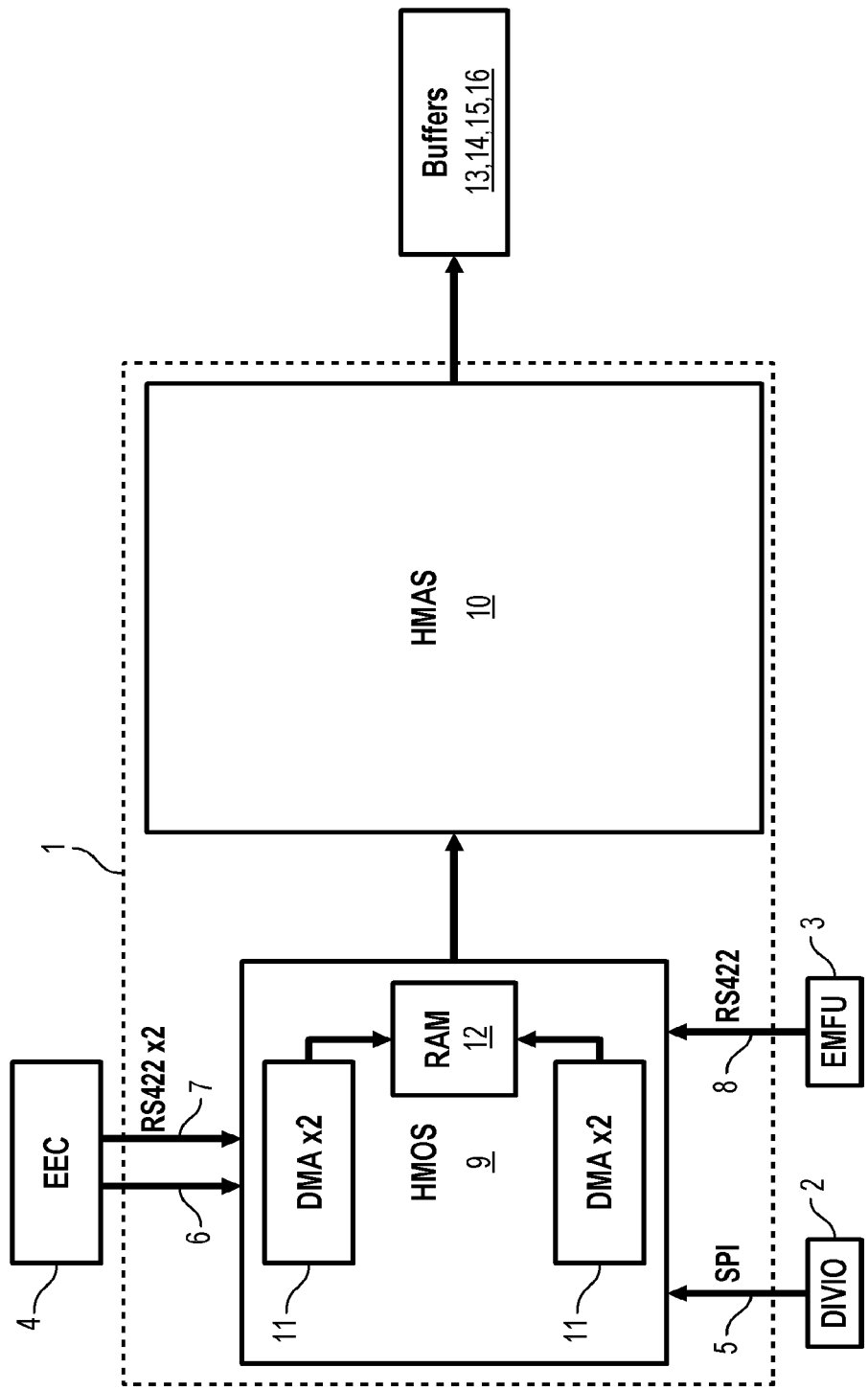
Figure 6:
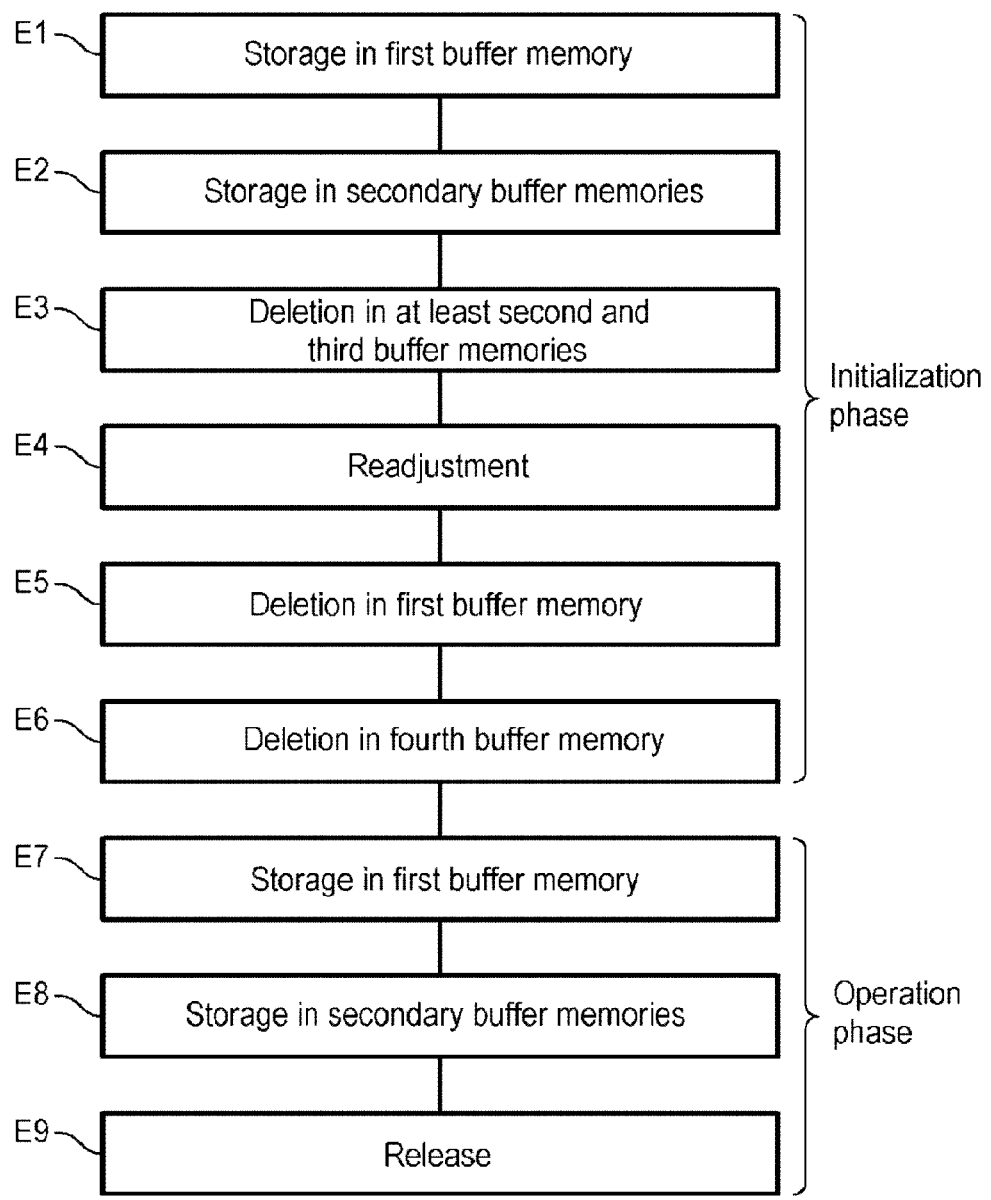
Figures 8A, 8B:

FIG. 5 schematically illustrates an aircraft maintenance computer according to one embodiment of the invention;

FIG. 6 is a diagram schematizing an example of implementation of a synchronization method according to one embodiment of the invention;

FIGS. 7a, 7b and 7c illustrate examples of the content of the second and third buffer memories during the initialization phase;

FIGS. 8a and 8b illustrate an example of implementation of EEC channel restoration.

DETAILED DESCRIPTION

One embodiment of the invention concerns a method to synchronize data frames transmitted to at least one maintenance algorithm executed by an aircraft maintenance computer 1.

The maintenance computer 1 is connected to at least one computing unit via at least one first digital data link 5 and at least one second and one third secondary digital data links 6 and 7.

Figure 1:
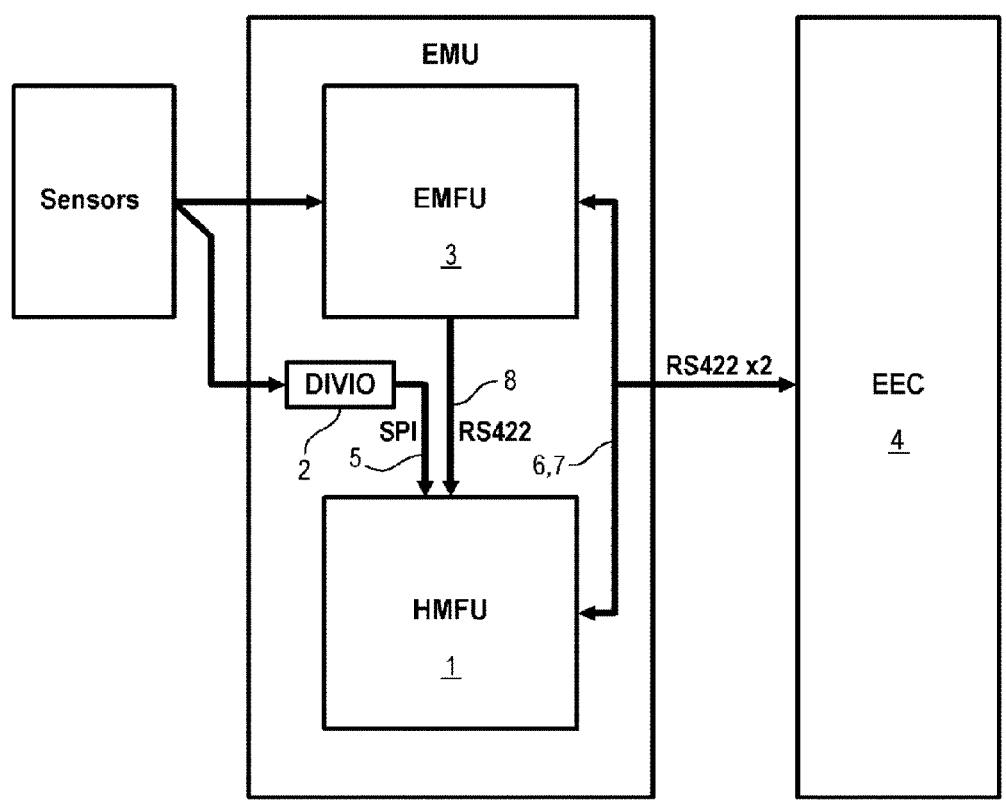

For example, as illustrated in FIG. 1, the maintenance computer 1 comprises a health monitoring functional unit HMFU and the first link 5 is a SPI link connecting the maintenance computer 1 to a digitized input-output unit DIVIO 2, and the secondary links comprise three RS422 links 6, 7 and 8 respectively connecting the maintenance computer 1 to the two channels of an electronic engine controller EEC 4 and to an engine monitoring functional unit EMFU 3.

The links can send data frames in accordance with the internal clocks of the units associated therewith at the following rates: 1 frame every 15 ms for each of the RS422 links and one frame every 7.5 ms for the SPI link.

As illustrated in FIG. 5, the maintenance computer 1 may execute an operating system (HMOS) 9 which receives the data transmitted on the first link 5 and on the secondary links 6, 7 and 8 to make these data available to an application software (HMAS) 10 executed by the maintenance computer 1.

The frames received on the different links can be received by DMA components 11 which manage writing thereof in the RAM memory 12 of the maintenance computer 1. The received frames are then read in the memory by the HMAS which decodes these frames and sends them to the at least one maintenance algorithm executed by the maintenance computer 1.

The HMAS is able to read the data available in the RAM memory every 120 ms. Such a rate is compatible with constraints related to the size of memory spaces available in the operating system only allowing the recovery of a maximum of 480 ms of data on each read-out. With the above proposed frame transmission rates, the HMAS, on each read-out in the RAM memory, is able on average to collect 8 frames on each of the secondary links and 16 frames on the first link, but major differences are possible relative to this mean value of up to more or less 50%. The HMAS can then send the read, decoded frames to the at least one maintenance algorithm every 960 ms. The HMAS in this case recovers an average of 8 frames on each secondary link every 120 ms, i.e. on average 64 frames every 960 ms, and twice as many on the first link. Such rates allow correct feeding of input data to the maintenance algorithms for which the typical execution periods are no more than 125 ms, 250 ms or 1 second and can be set at 120 ms, 240 ms and 960 ms so as to be a multiple of the frame-sending period on the links.

The method according to one embodiment of the invention, for synchronization of the data transmitted to the at least one maintenance algorithm, proposes storing the frames received on the first link 5 e.g. after HMAS reading thereof in the RAM memory, in a first buffer memory 13, and for each secondary data link storing the frames received on this secondary data link e.g. after HMAS reading thereof in the RAM memory, in a buffer memory dedicated to this link. Therefore, the frames received on the second link are stored in a second buffer memory 14 and the frames received on the third link are stored in a third buffer memory 15. The frames received on the secondary link 8 with the EMFU can be stored in a fourth buffer memory 16.

The writing of the frames in the buffer memories and synchronization thereof can be performed by the maintenance computer 1, e.g. by the HMAS.

Said buffer memories may be circular buffer memories. Each buffer memory may in particular comprise three zones:
    an acquisition zone to collect the frames read in the RAM memory,
    an overspill zone so as not to lose the frames received when the acquisition zone is full, a decoding zone to decode data before they are sent to the at least one maintenance algorithm.

Each zone can allow the storing of 960 ms of data divided into 4 zones of 240 ms called major frames. Each major frame is divided into 16 small memory spaces called minor frames and corresponding to one RS422 frame or to two SPI frames i.e. to the data transmitted every 15 ms.

The designated first position of a buffer memory is the first position of its acquisition zone.

The release of the frames contained in the decoding zones towards the at least one maintenance algorithm is triggered by the filling of all the acquisition zones of all the buffer memories, when the equivalent of 960 ms of data has been received on all the links. Since the frames are not received at the same rhythm on the different links, it is possible that the acquisition zone of one buffer memory is full while the acquisition zone of another buffer memory is not yet full. Such a filling may therefore take more or less 960 ms depending on the hazards of reception. The overspill zone is then used to store the frames received once the acquisition zone of one buffer memory is filled whilst awaiting the filling of the acquisition zones of all the other buffer memories.

When all the acquisition zones have been filled, rotation takes place: the data of the frames contained in the decoding zones are released towards the at least one maintenance algorithm, the frames contained in the acquisition zone become those of the decoding zone for decoding thereof, and those in the overspill zone become those of the acquisition zone. The decoding zones thus emptied are then used as overspill zones.

Each buffer memory dedicated to a secondary link may form a channel of a single buffer memory unit. Such a buffer memory unit is then designed to store in its different channels the frames read in the RAM memory and received from the different secondary links.

To synchronize the input data received by the at least one maintenance algorithm, the different data links transmitting data frames to the maintenance computer 1 on the first link and on the secondary links are synchronized with each other.

To do so, one of the links is chosen to be the clock reference for all the frames received by the maintenance computer. The link chosen as clock reference is the first data link 5. This is preferably the most reliable of the data links. For example, the link chosen as clock reference may be the SR link since it appears to be the most reliable link. Links 6 and 7 with the EEC 4 may be perturbed by the engine environment between the EEC and EMU casings. In addition, among the EMU internal links, the SPI link is shorter than the RS422 link 8. This makes it possible not to use an additional clock as reference clock, such as an internal HMFU clock which would have made the solution more complex. As a result, it is considered that the first link used as reference is never lost and that the difference in the number of frames between the first link, such as the SPI link, and the secondary links is negligible over the duration of a flight time, thereby avoiding the need to readjust the frames received on the first link in relation to the frames received on the other links.

In addition, the frames transmitted on some secondary links including the second and third link contain an identification number called a label, the labels of the successive frames transmitted on one same data link being incremented cyclically and continuously. This may be the case in particular for frames transmitted by the two EEC channels.

The identification numbers of the frames transmitted by the first link and the other secondary links are time stamps, the limit value thereof being sufficiently high for the flight times under consideration.

Synchronization of the frames may comprise an initialization phase and a normal operating phase.

The initialization phase is essential to meet the constraint of repeatability of the at least one maintenance algorithm. It ensures the start of the filling of the buffer memories so that the first frame stored in the second buffer memory 14 and in the third buffer memory 15 includes one same predefined identification number. For example, when the frames transmitted on the links with the two EEC channels include a label varying cyclically from 1 to 16, the initialization phase can guarantee that the first stored frame transmitted on each of these links includes the label "1". Any other "label" value of between 1 and 16 could be suitable provided that the repeatability of the transmitted data is well heeded. It also ensures that the first buffer memory dedicated to the first link stores a number of frames equal to the smallest multiple of a first predefined number equal to or higher than twice the number of frames received on one of the second or third links.

As illustrated in FIG. 6, the initialization phase may comprise the steps described below.

At a first storage step E1, a first predefined number of frames successively received on the first link during a first time interval and ordered in relation to their identification number are stored at successive positions of the first buffer memory starting from its first position. For example, the first time interval may be 3*120 ms, which corresponds to the storage of 3*16 frames received on the SPI link. By successive positions is meant successive memory locations among an ordered list of memory locations. These successive memory locations do not necessarily correspond to adjacent, increasing or decreasing memory addresses.

At a second storage step E2, for each secondary link, the frames successively received on said secondary link during said first time interval together with a padding frame for each frame transmitted on said secondary link during said first time interval and not received, are stored at successive positions of the buffer memory dedicated to said secondary link starting from its first position. Detection of the non-receipt of a frame transmitted on a link can be obtained by comparing the identification numbers of the received frames, in particular of two successively received frames, and by ascertaining that these numbers do not follow one another in the case of labels, or in the case of time-stamping that the time interval between two successively received numbers is for example equal to about twice the usual frame transmission period on this link. In the event of detection of a frame transmitted on a link and not received, a padding frame is stored in the buffer memory dedicated to this link at the position that the transmitted frame should have occupied if it had been received, before storing the subsequently received frame in the buffer memory. Such a storing over a first time interval of 3*120 ms allows the certain storage, among said frames and for each secondary link having an identification number of label type, of at least one frame of each label, in particular a frame of the label chosen to ensure the repeatability of the data sent to the at least one maintenance algorithm, e.g. label "1". An example of the content of the second and third buffer memories after this step is illustrated in FIG. 7a.

If no frame is received on the second and third link, all the buffer memories can be emptied and the first storage step E1 can again be implemented.

At a first deletion step E3, the frames stored before the first frame comprising the predefined identification number are deleted at least in the buffer memories dedicated to the second and third links. Such a deletion can be applied to the buffer memories dedicated to all the links on which frames are transmitted comprising an identification number of label type. For example, all the frames acquired on the links 6 and 7 with the two channels of the EEC 4 and stored before the first frame comprising the label "1" are deleted in the second and third buffer memories. The result of such a deletion is illustrated in FIG. 7b.

If all the frames stored in the second or third buffer memory, or more generally in a buffer memory dedicated to a link on which frames are transmitted comprising an identification number of label type, do not include any frame comprising the label chosen to ensure repeatability of the data sent to the at least one maintenance algorithm, e.g. label "1", all the stored frames are deleted and the link is declared to be down. If all the links on which frames are transmitted comprising a label-type identification number are declared to be down, the initialization phase can be restarted at the first storage step E1.

At a first readjustment step E4, the storage of the frames remaining in the buffer memories is modified so that the first position of the second and third buffer memories, and more generally of all the buffer memories dedicated to a link on which frames are transmitted comprising a label-type identification number, corresponds to the position of the first frame comprising the predefined identification number e.g. label "1". According to a first variant, the frames stored in such a buffer memory after the first deletion step E3 are moved maintaining the order thereof so that the frame comprising the predefined identification number is stored at the first position of the buffer memory. According to a second variant, the stored frames remain stored at the same memory location, but the first position of the buffer memory is moved to the position of the buffer memory storing the frame comprising the predefined identification number, consequently leading to displacement of the zones of the buffer memory. The result of such a readjustment on the second and third buffer memories is illustrated in FIG. 7c.

At a second deletion step E5 the oldest frames among those stored in the first buffer memory are deleted so that the first buffer memory stores a number of frames equal to the smallest multiple of a predefined number equal or higher than twice the number of frames received on one of the second or third links. For example, this predefined number may be 16 and then correspond to the number of frames transmitted on the SPI link during an interval of 120 ms. The frames remaining in the first buffer memory are then readjusted as at readjustment step E4 so that the position of the oldest frame stored in the first buffer memory corresponds to the first position of the first buffer memory.

At a second adjustment step E6, for each secondary link when the identification number of the frames received by the maintenance computer on said secondary link comprises a time stamp, the oldest frames among those stored in the buffer memory dedicated to this link are deleted or padding frames are inserted, so that the buffer memory dedicated to this secondary link stores a number of frames equal to the number of frames, among the number of frames stored in the second and third buffer memory, that is closest to the number of frames stored in the buffer memory dedicated to this secondary link at the start of the second adjustment step E6. More specifically, if more frames were received on this link than there are remaining frames stored in the second or third buffer memory, the oldest frames among those stored in the buffer memory dedicated to this link are deleted and the remaining frames are readjusted in the same manner as at the second deletion step E5. Conversely, if fewer frames were received on this link than there are remaining frames stored in the second or third buffer memory, padding frames are inserted e.g. after the last stored frame.

Once this initialization phase has been carried out, the buffer memories dedicated to a link on which frames are transmitted comprising a label-type identification number such as the buffer memories of the EEC channel links, store at their first position frames which comprise the predefined identification number e.g. "label" 1, and the difference in the number of frames between these memories is minimal.

As soon as the initialization phase is completed the normal operation phase is carried out, the purpose of which is to fill the buffer memories with synchronized, continuous data as and when they arrive, irrespective of reception hazards.

The normal operation phase is applied repeatedly to the frames received during a second time interval e.g. on average every 120 ms.

The general principle of the normal operation phase is to act on the number of received frames so that the frames stored at the same position in the different buffer memories contain frames that indeed correspond to the same data acquisition time, in other words each frame stored at a position of the second buffer memory comprises the same identification number as the frame stored at the same position in the third buffer memory.

At a third storage step E7, the frames successively received on the first link during the second time interval are stored at successive positions of the first buffer memory, following after the last occupied position of the acquisition zone or the last occupied position of the overspill zone if the acquisition zone is full. In the event that such a step is applied at 120 ms of data as indicated above, 16 frames transmitted on the SPI link are stored in the first buffer memory on each application of this step.

At a fourth storage step E8, for each secondary link, the frames successively received on said secondary link during the second time interval and a padding frame for each frame transmitted on said secondary link and not received, are stored at successive positions of a buffer memory dedicated to said secondary link, after the last occupied position of the acquisition zone or the last occupied position of the overspill zone if the acquisition zone is full. Therefore, each frame stored at a position of the second buffer memory comprises the same identification number as the frame stored at the same position in the third buffer memory and all the secondary links remain synchronized. In the event that said step is applied at 120 ms of data as indicated above, 8 frames on average are stored in each buffer memory on each application of this step.

Throughout this step if no frames are received on a secondary link, which transmits frames comprising a label-type identification number, within the second time interval needed for receiving of the first predefined number of frames on the first link e.g. 120 ms, the link is declared to be down.

If the second or third link, or more generally a link on which frames are transmitted comprising a label-type identification number, is declared to be down, the frames received on this link during the second time interval are deleted and as many padding frames are inserted in the buffer memory dedicated to this link down as the number of frames received on the second or third links remaining up. If all the links on which frames are transmitted comprising an identification number of label type, are declared down, the frames received on these links during the second time interval are deleted and 8 padding frames are inserted in the buffer memories dedicated thereto. Also, if no frame is received within the second time interval on a secondary link on which frames are transmitted comprising an identification number of time stamp type, e.g. the EMFU link, 8 padding frames are inserted in the buffer memory dedicated thereto. In this manner no drift is introduced into the number of frames between the links.

If a link declared to be down is no longer down, logics are used to resynchronize the link so that it is no longer considered to be down, i.e. the link is restored.

To do so, the computer 1 detects the receiving on said secondary link of a set of successively received frames, said set of frames comprising a fourth predefined number of frames and a frame comprising the predefined identification number e.g. label "1". In the event of positive detection, the computer stores the frame comprising the predefined identification number and the frames subsequently received on said secondary link at successive positions of the buffer memory dedicated to said secondary link, so that the frames stored at a second position of the buffer memory dedicated to said secondary link and at a second position of the second or third buffer memory comprise the predefined identification number. More specifically, the frames received during the second time interval on said link before the frame comprising the predefined identification number are deleted and the computer determines whether the first non-filled position of the buffer memory dedicated to the link being restored is closer to the position, so-called position A, of another buffer memory dedicated to a link up storing the most recent frame comprising the predefined identification number received on this link up e.g. label "1", or to the position, so-called position B, of this buffer memory at which the next frame will be stored comprising the predefined identification number and which is to be received on this link up i.e. 16 positions further along for example. In the first case, the frames stored in the buffer memory starting from position A are deleted and the frame comprising the predefined identification number and the frames subsequently received are stored starting from position A. In the second case, padding frames are stored in the buffer memory dedicated to the link being restored up as far as the position preceding position B, and the frame comprising the predefined identification number and the frames subsequently received are stored starting from position B. The link can then be declared up. The different steps corresponding to the first case are illustrated in FIG. 8a and FIG. 8b.

The release of frames towards the at least one maintenance algorithm is then triggered by filling of all the acquisition zones of all the buffer memories e.g. when the equivalent of 960 ms of data, i.e. 64 frames for each secondary link have been stored in each buffer memory.

At a release step E9, if the acquisition zones of all the buffer memories are not filled, the third storage step E7 is again implemented. Conversely, when frames are stored in the first buffer memory and in each buffer memory dedicated to a secondary link, at least at one second predefined number of positions, the frames stored at said first predefined number of positions of said buffer memories are transmitted to said at least one maintenance algorithm. More specifically, when all the acquisition zones have been filled, rotation takes place: the data of the frames contained in the decoding zones are released towards the at least one maintenance algorithm, the frames contained in the acquisition zone become those of the decoding zone for decoding thereof and those in the overspill zone become those of the acquisition zone. The first position of each buffer memory is then modified and henceforth corresponds to the first position of the new acquisition zone of the buffer memory. The computer then again performs the first step of the operation phase i.e. the third storage step E7.

Before the rotation of the buffer memory zones, the computer can verify the synchronization between the secondary links on which frames are transmitted comprising an identification number of label type, e.g. the links of the EEC channels. If the buffer memory dedicated to said data link stores fewer frames than another buffer memory of this type and if the difference is higher than a first threshold value, this link is declared to be down and padding frames are added in the buffer memory dedicated thereto so that both buffer memories comprise the same number of frames.

Similarly, the computer can verify the synchronization between a secondary link on which frames are transmitted comprising an identification number of time stamp type, such as the EMFU link, and the secondary links on which frames are transmitted comprising an identification number of label type. If the minimum difference between the number of frames stored in the buffer memory dedicated to this link and the number of frames stored in the buffer memories dedicated to the links on which frames are transmitted comprising an identification number of label type is higher than a second threshold value, some frames are deleted or padding frames are added in the buffer memory dedicated to this link so that this buffer memory comprises as many frames as the buffer memory initially having this minimum difference. It is effectively preferable to delete frames originating from the link connecting the computer to the EMFU, rather than frames originating from links linking the computer to the EEC. Since these are sequenced they can only be deleted in groups of 16 which corresponds to desynchronization of 240 ms. By acting on the EMFU frames, it is possible to obtain better resynchronization modularity and hence to provide earliest correction.

The invention claimed is:

1. A method for synchronizing data frames transmitted to at least one maintenance algorithm, executed by an aircraft maintenance computer, on a first digital data link and at least one second and one third secondary digital data links,
    said frames comprising an identification number,
    the identification numbers of the frames transmitted on the second and third links being comprised in a finite and cyclical sequence of numbers, the identification numbers of the frames transmitted on one of the second and third links being incremented on each transmission of a new frame on said one of the second and third links,
    said method being implemented by said computer and comprising:
    an initialization phase storing the frames received on each of said first, second, and third links respectively in a first buffer memory dedicated to the first link, a second buffer memory dedicated to the second link, and a third buffer memory dedicated to the third link, the frames stored at a first position of the second buffer memory and at a first position of the third buffer memory comprising one same predefined identification number, and the first buffer memory storing a number of frames equal to the smallest multiple of a first predefined number equal to or higher than twice the number of frames received on one of the second or third links,
    an operation phase storing the frames received on each of said first, second, and third links in dedicated first, second, and third buffer memories, each frame stored at a position of the second buffer memory including the same identification number as the frame stored at the same position of the third buffer memory.

2. The method according to claim 1, wherein the operation phase comprises steps of:
storing frames successively received on the first link at successive positions of the first buffer memory,
for each secondary link, storing the frames successively received on said secondary link and a padding frame for each frame transmitted on said secondary link and not received, at successive positions of a buffer memory dedicated to said secondary link,
when frames are stored in the first buffer memory and in each buffer memory dedicated to a secondary link, over at least one second predefined number of positions, transmitting to said at least one maintenance algorithm the frames stored at said second predefined number of positions of said buffer memories.

3. The method according to claim 1, wherein the initialization phase comprises the steps of:
storing at successive positions of the first buffer memory, a third predefined number of frames successively received on the first link during a first time interval,
for each secondary link, storing at successive positions of the buffer memory dedicated to said secondary link the frames successively received on said secondary link during said first time interval and a padding frame for each frame transmitted on said secondary link during said first time interval and not received,
deleting the frames stored before the first frame comprising the predefined identification number, at least in the second and third buffer memories,
deleting the oldest frames among those stored in the first buffer memory, so that the first buffer memory stores a number of frames equal to the smallest multiple of the first predefined number equal to or higher than twice the number of frames received on one of the second or third links.

4. The method according to claim 1, wherein said secondary links comprise at least one additional secondary link such that the identification number of the frames received by the computer on said at least one additional secondary link comprises a time stamp, and wherein the initialization phase for each additional secondary link comprises a step of deleting the oldest frames among the frames stored in the buffer memory dedicated to this link or of inserting padding frames, so that said buffer memory dedicated to said additional secondary link stores a number of frames equal to the number of frames, among the number of frames stored in the second and third buffer memory, that is closest to the number of frames received on said additional secondary link.

5. The method according to claim 1, comprising a step of detecting the frames transmitted on a link and not received, by comparing the identification numbers of the received frames.

6. The method according to claim 1, comprising steps of:
detecting the non-receiving of frames on a secondary link, so-called link down, during a time interval required for receiving of the first predefined number of frames on the first link,
detecting the receiving on said secondary link down of a set of successively received frames, said set of frames comprising a fourth predefined number of frames and a frame comprising the predefined identification number,
storing the frame comprising the predefined identification number and the frames subsequently received on said secondary link at successive positions of the buffer memory dedicated to said secondary link, so that the frames stored at a second position of the buffer memory dedicated to said secondary link and at a second position of the second or third buffer memory comprise the predefined identification number.

7. A non-transitory computer-readable medium storing a computer program comprising code instructions for executing the method for synchronizing frames according to claim 1 when the computer program is executed by a processor.

8. A system comprising:
an aircraft maintenance computer connected to at least one computing unit via at least one first digital data link and at least one second and one third secondary digital data links,
a first buffer memory dedicated to the first link, and
for each secondary data link, a buffer memory dedicated to said secondary data link,
said maintenance computer being configured to implement the method according to claim 1.

9. The system according to claim 8, wherein the buffer memories are circular buffer memories.

10. The system according to claim 8, wherein each buffer memory dedicated to a secondary link forms a channel of a single buffer memory unit of said system.

11. The system according to claim 8, wherein the first link is a SPI link and the secondary digital links are RS422 links.

12. The system according to claim 8, wherein the maintenance computer comprises a monitoring functional unit to anticipate failures and facilitate maintenance, and wherein the first link is a SPI link connecting the maintenance computer to a digitized input-output unit, and the secondary links comprise three RS422 links connecting the maintenance computer to an engine monitoring functional unit and to the two channels of an electronic engine controller.

* * * * *

UNITED STATES PATENT AND TRADEMARK OFFICE
CERTIFICATE OF CORRECTION

Page 1 of 1

PATENT NO. : 9,900,383 B2
APPLICATION NO. : 15/301035
DATED : February 20, 2018
INVENTOR(S) : Oceane Lucienne Monique Fremaux et al.

It is certified that error appears in the above-identified patent and that said Letters Patent is hereby corrected as shown below:

On the Title Page

Item (74), change "Nestadt" to --Neustadt--; and

In the Specification

Column 7, Line 48, change "SR link" to --SPI link--.

Signed and Sealed this
Fourteenth Day of April, 2020

Andrei Iancu
*Director of the United States Patent and Trademark Office*